Patented Sept. 2, 1947

2,426,624

UNITED STATES PATENT OFFICE 2,426,624

EXTRACTION OF QUINONOID HYDROCARBONS FROM BENZENOID HYDROCARBONS BY MEANS OF ANHYDROUS HYDROGEN FLUORIDE

Arthur P. Lien, Hammond, Ind., assignor to Standard Oil Company, Chicago, Ill., a corporation of Indiana No Drawing. Application July 2, 1946, Serial No. 681,122

10 Claims. (Cl. 260—675)

This invention relates to a process for the selective extraction of polynuclear aromatic hydrocarbons comprising at least one 6-carbon ring having a quinonoid structure from polynuclear aromatic hydrocarbons having a benzenoid structure by the employment of a selective solvent consisting essentially of liquid, substantially anhydrous hydrogen fluoride. A particularly desirable application of this invention relates to a process for the selective extraction of anthracene or alkylanthracenes from phenanthrene or alkylphenanthrenes.

A benzenoid hydrocarbon structure is a six-carbon ring structure containing three double bonds, typically as in benzene itself. A quinonoid hydrocarbon comprises a six-carbon ring structure containing two or more double bonds, each of which is attached to a nuclear carbon atom and does not terminate at another carbon atom in the same nucleus, e. g., carbon ring structures such as are encountered in anthracene and in ortho- and para-benzoquinones. Pyrene and perylene may also be regarded as containing quinonoid rings.

I have discovered that liquid, substantially anhydrous hydrogen fluoride is a selective solvent for polynuclear aromatic hydrocarbons such as anthracene under conditions where phenanthrene-type hydrocarbons are substantially undissolved.

This selective solubility behavior is quite remarkable since phenanthrene is far more soluble in an extremely wide variety of solvents than anthracene (note for example J. M. Clarke, "Solubilities, separation and purification of anthracene, carbazole and phenanthrene," Ind. Eng. Chem. 11, 204–9 (1919)).

Prior art methods for the separation of anthracene and phenanthrene have involved, in addition to repeated extraction with solvents such as benzol or pyridine, some form of chemical conversion such as oxidation, halogenation or sulfonation which has resulted in reduced yields of anthracene. In accordance with my invention, there is no necessity for resorting to supplemental chemical conversions to resolve mixtures comprising anthracene and phenanthrene.

In the operation of my process a solid, comminuted mixture of anthracene and phenanthrene, e. g., powdered commercial anthracene cake, can be extracted with liquid hydrogen fluoride. Commercial crude anthracene cakes are of variable composition and contain between about 10 and about 35 percent of anthracene, about 5 to about 20 percent of carbazole, the remainder being phenanthrene, fluorenes and other oils and solids. I can also use partially purified anthracene cakes which may contain as much as about 60 percent by weight of anthracene, resulting from the application of known purification procedures to commercial crude anthracene cake.

My process can also be applied to the purification of crude phenanthrene, for example the technical phenanthrene of commerce.

The process of my invention can also be applied to the extraction of oil fractions containing anthracene and phenanthrene or their alkyl derivatives. In the commercial distillation of coal tar it is customary to segregate an oil fraction containing anthracene and phenanthrene, and usually carbazole and other acidic nitrogen compounds, said oil fraction being variously known as "anthracene oil," "heavy oil," "dead oil," "green oil," and "anthracene cake." This more or less broad distillate fraction may boil between about 270° C. and about 380° C., e. g. about 300° C. to 360° C. or about 270° C. to 340° C.

Although the solvent extraction process of this invention may be applied to mixtures which contain carbazole and other acidic nitrogen compounds it may be desirable to remove these compounds from the charging stock by a preliminary distillation with alkalies such as KOH, NaOH, $K_2CO_3$, or their mixtures or the like. This preliminary distillation results in the formation of salts of the acidic nitrogen compounds which are far less volatile than anthracene, phenanthrene and similar hydrocarbons, which distill from the salts. The distillate hydrocarbons are then used as the charging stock for the selective solvent extraction process of this invention.

Alternatively I may dispense wholly or in part with preliminary carbazole removal by alkali distillation of the charging stock and instead can subject raffinate and extract materials derived from the hydrogen fluoride extraction process to alkali distillation; this has the advantage of removing not only acidic nitrogen compounds, but also HF and organic fluorides.

Although, as I have pointed out above, I can subject solid mixtures comprising anthracene and phenanthrene to extraction, I prefer to dissolve or slurry the mixture in a suitable liquid solvent or carrier medium which is substantially insoluble in my novel extraction solvent under the extraction conditions. Mononuclear aromatic hydrocarbons and their mixtures with paraffin or cycloparaffin hydrocarbons are substantially insoluble in liquid hydrogen fluoride at the temperatures which will ordinarily be employed in my extraction process. Suitable solvents or carrier media for mixtures containing anthracene and phenanthrene are therefore, coal tar benzols or aromatic naphthas, e. g. naphthas containing a suitable proportion of aromatic hydrocarbons produced from petroleum, for example, naphthas produced by catalytic hydroforming or the like. I do not, however, choose to be limited to the solvents specifically named herein, as any other solvents which will serve to dissolve or suspend the hydrocarbon mixture to be extracted can be used providing that such solvent is substantially insoluble in liquid, substantially anhydrous hydrogen fluoride under the extraction conditions.

In those cases where the mixture of hydrocarbons to be extracted comprises chiefly anthracene, a slurry rather than a true solution is obtained with mononuclear aromatic hydrocarbon solvents because of the sparing solubility of anthracene therein. Phenanthrene, on the other hand, has a much greater solubility in mononuclear aromatic solvents. The application of both a mononuclear aromatic hydrocarbon solvent and liquid hydrocarbon fluoride to solid or dissolved mixtures comprising anthracene and phenanthrene results in the selective dissolution of phenanthrene in the aromatic solvent and the selective dissolution of anthracene in the liquid hydrogen fluoride.

As I have indicated above, my preferred extraction solvent is liquid, substantially anhydrous hydrogen fluoride. However, this solvent may contain small quantities of water, for example less than about 5 percent by weight, although water in general tends to impair the efficiency of hydrogen fluoride as an extractant for anthracene, alkylanthracenes or other polynuclear aromatic hydrocarbons of quinonoid structure. Although their use is not essential for the operation of the process of this invention, it may sometimes be desirable to add to the hydrogen fluoride a small proportion, for example between about 1 and about 10 percent by weight, of a metal halide, based on the hydrogen fluoride. A preferred metal halide is boron fluoride although other metal halides such as ferric chloride, stannic chloride, aluminum halides, etc. may also be used. I have not found the joint use of metal halides and hydrogen fluoride to be necessary and, in fact, I prefer to operate without the addition of metal halides to the liquid hydrogen fluoride solvent for the reason, among others, that their inclusion entails a more elaborate solvent recovery system than would otherwise be necessary.

For the extraction of solid mixtures I can employ Soxhlet or other known apparatus for the continuous or batch extraction of solids. When a solution or slurry of the hydrocarbon mixture to be extracted is employed, contacting thereof with the hydrogen fluoride solvent is effected in any suitable manner, for example by mechanical agitation or countercurrent flow against the hydrogen fluoride solvent, either batchwise or continuously. Various methods of effecting contacting between the selective solvent of this invention and the mixture to be extracted can be employed as is well known in the art of selective solvent extraction of solid or liquid materials, and forms no part of the present invention.

The extraction operation of this invention can be effected over a very considerable temperature range. Usually it is possible to employ temperatures between about 0° F. and about 180° F. Cracking and condensation reactions set in at high temperatures above about 200° F., particularly when more than 100 volume percent of HF based on hydrocarbons is present or when metal halides are used in conjunction with the hydrogen fluoride. I prefer to avoid these reactions and to limit my process substantially to solvent extraction rather than chemical conversion. I prefer to employ temperatures between about 40° F. and about 100° F. and have effected extraction at normal room temperaure, viz. about 75° F. Sufficient pressure will be maintained in the extraction zone to maintain the hydrogen fluoride solvent for the most part in the liquid phase.

Following the extraction operation an extract phase comprising a liquid hydrogen fluoride solution of anthracene, alkylanthracenes or other polynuclear aromatic hydrocarbons containing at least one quinonoid ring is allowed to settle out, either in the extraction zone or in a separate settling zone. When a solution or suspension is extracted with liquid hydrogen fluoride, the extraction mixture can be separated into two immiscible layers, the lower layer comprising a hydrogen fluoride solution of anthracene or other quinonoid hydrocarbons and the upper layer comprising phenanthrene or other benzenoid hydrocarbons. Hydrogen fluoride can be separated from the extract layer by distillation, preferably at atmospheric or reduced pressures when the hydrogen fluoride is vaporized leaving relatively pure anthracene or other quinonoid hydrocarbon. The removal of hydrogen fluoride from the extract layer can be facilitated by passing therethrough inert stripping gases such as nitrogen, carbon dioxide, normally gaseous paraffin hydrocarbons, etc. The raffinate layer is heated to drive off small quantities of hydrogen fluoride and any auxiliary solvent which may have been used, e. g. benzol, and phenanthrene or other benzenoid hydrocarbons are recovered as crystalline solids.

In order to remove small amounts of residual hydrogen fluoride and possibly organic fluorine-containing compounds such as hydrocarbon fluorides, from either or both the extract or raffinate materials, these may be contacted in the molten state or in solution in suitable solvents with adsorptive materials such as bauxite, adsorptive clays, activated carbon, or with adsorptive materials containing KOH, NaOH, Ca(OH)$_2$, KF, NaF, CaF$_2$ or the like in order to decompose organic fluorides and to adsorb hydrogen fluoride. Alternatively the after-treating of raffinate and extracted materials may take the form of a wash with water or dilute alkalies to remove residual hydrogen fluoride or organic fluorides. Hydrogen fluoride recovered from effluents of the extraction zone can be recycled to said zone, optionally after purification by procedures which are known in the art, e. g. fractional distillation to remove water or the like. The auxiliary solvent, such as benzol, which is recovered is likewise recycled to the extraction zone.

In order to illustrate but not unnecessarily to limit my invention, the following example of an application of my novel extraction process is furnished:

A sample of commercial phenanthrene containing about 90 percent phenanthrene was dissolved in benzene and stirred with liquid hydrogen fluoride in a carbon steel pressure vessel provided with a stirrer which was operated at 1725 R. P. M. The resulting product was separated into an upper hydrocarbon layer and a lower HF-extract layer. Experimental conditions and results are summarized below:

Feed
- 800 cc. benzene ($n_D^{20}$ 1.5004) $n_D^{20}$ of solution 1.5410
- 200 g. commercial phenanthrene HF _____ 200 cc.
Contact time _____ ½ hr.
Temp _____ 74° F.
$n_D^{20}$ of raffinate solution 1.5367
Percent extraction based on $n_D^{20}$ _____ 10.3
Weight of solid extract _ 23.5 g.
Percent extraction based on weight of extract __ 11.8

The extract, after removal of HF, was a crystalline light brown solid, which, on recrystallization from a hexane-benzene solvent, gave shiny, almost colorless, leaf-like crystals. The solvent was evaporated from the raffinate to give a solid product. The following melting point data were obtained:

Impure phenanthrene feed _____°F__ 212-242
Raffinate crystals _____°F__ 210-217
Extract crystals _____°F__ 415-420

Since the melting point for pure phenanthrene is 212° F., the melting point data on the feed shows the presence of a high melting impurity. The HF treatment resulted in a marked improvement in the purity of the phenanthrene (as shown by the relatively low melting point spread of the raffinate) by removal of the high melting impurity to the extract layer. This extract product was identified as relatively pure anthracene by virtue of the fact that it gave no lowering in melting point when mixed with an authentic sample of anthracene. Ultra-violet absorption analysis of the extract product indicated that it contained about 75 weight percent of anthracene. The extract product also contained nitrogen as indicated by a qualitative sodium fusion analysis, as described in Shriner and Fuson, "The Systematic Identification of Organic Compounds," p. 60 (1935). The purified phenanthrene could undoubtedly be further refined by further extraction treatments with liquid hydrogen fluoride.

The process of my invention is also suitable for the selective extraction of anthracene and alkylanthracenes from hydroformer bottoms. Naphthalene and alkylnaphthalenes are relatively insoluble in liquid, substantially anhydrous hydrogen fluoride under conditions where anthracene and anthracene derivatives are readily dissolved. Hydroformer bottoms, sometimes known as hydroformer polymer, is produced by the catalytic aromatization of virgin or cracked naphthas in the presence of catalysts such as 4-10 percent molybdena supported on an activated alumina at temperatures between 850 and 1050° F., preferably in the presence of hydrogen. The hydroformer bottoms is usually taken as the aromatized hydrocarbon fraction boiling between about 425 and 650° F. A representative hydroformer bottoms may have the following chemical composition, by volume:

|  | Per cent |
|---|---|
| Paraffins | 6-10 |
| Monocyclic aromatics and tetralins | 15-20 |
| Naphthalene | 1-3 |
| Methylnaphthalenes | 20-25 |
| Alkylnaphthalenes [1] | 25-35 |
| Anthracene and other polynuclear aromatics | 6-8 |

[1] Dimethyl and higher alkyl groups.

I may subject the entire hydroformer bottoms to my extraction process but I prefer to employ an anthracene concentrate fraction, i. e., a fraction consisting of the higher boiling portion of the hydroformer bottoms, for example, boiling between about 600° F. and the maximum boiling point of the hydroformer bottoms. Similar naphthalene-anthracene mixtures can be derived from cracked tars and cracked recycle oils produced in thermal or catalytic cracking of hydrocarbon oils; they may likewise be subjected to my extraction process.

I have carried out further extractions with liquid, substantially anhydrous hydrogen fluoride which confirm the indications of the example given above that liquid hydrogen fluoride is a selective solvent for polynuclear aromatic hydrocarbons containing a quinonoid ring and has substantially no solvent power for polynuclear ring compounds containing only benzenoid structures. Pyrene was extracted to the extent of 30 weight per cent by treatment with liquid, substantially anhydrous hydrogen fluoride under the conditions set forth in the following table. Under the same conditions m-terphenyl, whose structure is entirely of the benzenoid type, was extracted to only a very minor extent. Only 2 per cent of terphenyl was recovered from the extract, but 10 per cent extraction was indicated by change in refractive index, a discrepancy which may be due to removal of an impurity of high refractive index. In the extraction operations tabulated below a solution of 10 volume per cent of the aromatic hydrocarbon feed stock in benzene was prepared, and the solution was extracted with 200 cc. of liquid, substantially anhydrous hydrogen fluoride per liter for 30 minutes at room temperature (about 75° F.) in a carbon steel pressure vessel, the contents being agitated at 1725 R. P. M. Following the contacting, a settling period of 2 hours without stirring was allowed in order to separate extract and raffinate layers.

| Aromatic Hydrocarbon | Pyrene | m-Terphenyl |
|---|---|---|
| $n_D^{20}$ Feed | 1.5318 | 1.5203 |
| $n_D^{20}$ Raffinate | 1.5221 | 1.5182 |
| Per cent Extraction (from $n_D^{20}$) | 30 | 10 |
| Per cent Extraction (from Wt. per cent Extract) | 30 | 2 |
| Per cent Extraction (from Loss in Wt. of Raffinate) | | 2 |
| M. P. Original Aromatic | 300 | 186 |
| M. P. of Aromatic in Extract | 298 | Gummy |

The following tabulation presents experimental data obtained by the extraction of amylnaphthalenes and a hydroformer bottoms respectively with liquid, substantially anhydrous hydrogen fluoride in a 1575 cc. carbon steel pressure vessel provided with a stirrer which was operated at 1725 R. P. M. in the course of contacting. In each experiment, a 20 per cent solution of the aromatic hydrocarbon charging stock was contacted with 200 cc. of hydrogen fluoride per liter for 20 minutes at temperatures between about 70°

F. and about 80° F. Normal heptane was used to dissolve the charging stock in experiments A and B; n-heptane containing 10% benzene was used in experiments C, D and E.

| Experiment | Amylnaphthalene, A | Hydroformer Bottoms | | | | |
|---|---|---|---|---|---|---|
| | | Total, B | 332–495° F. Fraction, C | 495–600° F. Fraction | | 600° F.– Bottoms, E |
| | | | | D | D' | |
| Refractive Index ($n_D^{20}$): | | | | | | |
| Feed Solution | 1.4280 | 1.4327 | 1.4350 | 1.4418 | 1.4418 | 1.4619 |
| Raffinate Solution | 1.4282 | 1.4282 | 1.4340 | 1.4400 | 1.4280 | 1.4288 |
| Weight per cent Aromatic Extract, based on— | | | | | | |
| $n_D^{20}$ | 0.0 | 11.2 | 2.7 | 4.1 | 31.5 | 52.0 |
| Actual Weight | 2.0 | 11.5 | 4.0 | | 24.4 | 56.0 |
| Properties of Solvent-Free Aromatics: | | | | | | |
| $n_D^{20}$ of Feed | | 1.5938 | 1.5672 | 1.5980 | 1.5980 | [1] 1.7175 |
| $n_D^{20}$ of Raffinate | | 1.5805 | 1.5606 | 1.5887 | 1.5719 | [1] 1.6303 |
| Specific Dispersion: | | | | | | |
| Feed | | 284 | 229 | 271 | 271 | [1] 550 |
| Raffinate | | 247 | 230 | 266 | 234 | 327 |

[1] Calculated values.

Consideration of the data presented above shows that a dicyclic benzenoid hydrocarbon, specifically amylnaphthalene, remains substantially undissolved in liquid hydrogen fluoride at room temperature. Experiment B, wherein the total hydroformer bottoms was used as a charging stock showed that about 11 per cent of the total bottoms was extracted with hydrogen fluoride. The raffinate in experiment B had a considerably lower refractive index than the feed stock, indicating that ring compounds more highly condensed than naphthalene were being removed. Accordingly, a sample of the hydroformer bottoms was fractionated into two distillate fractions and a bottom fraction, the three fractions being separately extracted with hydrogen fluoride in experiments C, D and E, respectively. Experiments C and D show that no appreciable extraction was occurring in the two distillate fractions, which contain very little tricyclic aromatic hydrocarbon content. In contrast the 600° F.-bottoms which contains appreciable quantities of anthracene and alkyl-anthracenes was extracted to the extent of more than 50 percent.

In experiment D', the contents from experiment D were allowed to stand without stirring in the reactor for about 48 hours at 212° F. When the reactor contents were cooled to room temperature a sample of the raffinate (upper layer) was taken which indicated that 31.5 percent extraction had occurred, based on reduction in refractive index. Examination of the extract layer showed that, by weight, 24.4 weight percent extract had been obtained. Considerable gas pressure, probably due to hydrogen, was noted in the reactor upon completion of experiment D'. The results of experiment D' are in marked contrast to those of D and indicate that the naphthalene and alkylnaphthalenes in the feed stock had undergone ring fusion in the presence of HF at the high temperature, with liberation of hydrogen and the formation of polynuclear aromatic hydrocarbons of higher molecular weight which are soluble in liquid hydrogen fluoride.

Although my invention has been described with reference to its application to certain charging stocks, it should be understood that it is not so limited and that my novel hydrogen fluoride extraction process may be applied generally to the selective dissolution of polynuclear aromatic hydrocarbons containing a quinonoid ring structure from their mixtures with polynuclear benzenoid hydrocarbons.

Having thus described my invention, what I claim is:

1. A process for separating a quinonoid hydrocarbon from a benzenoid hydrocarbon which comprises extracting a mixture of said hydrocarbons with a solvent consisting essentially of liquid, substantially anhydrous hydrogen fluoride and separating an extract of quinonoid hydrocarbon in liquid hydrogen fluoride.

2. The process of claim 1 wherein the quinonoid hydrocarbon is anthracene and the benzenoid hydrocarbon is phenanthrene.

3. A process for the separation of a quinonoid hydrocarbon from a mixture containing both quinonoid and benzenoid hydrocarbons, which process comprises dissolving said mixture in solvent which is essentially insoluble in liquid, substantially anhydrous hydrogen fluoride and thereafter extracting a quinonoid hydrocarbon from said solution with a solvent consisting essentially of liquid, substantially anhydrous hydrogen fluoride.

4. The process of claim 3 where the quinonoid hydrocarbon is anthracene and the benzenoid hydrocarbon is phenanthrene.

5. The process of claim 3 wherein a monocyclic aromatic hydrocarbon is employed as a mutual solvent for the quinonoid and benzenoid hydrocarbons.

6. The process of claim 3 wherein benzol is employed as a mutual solvent for the quinonoid and benzenoid hydrocarbons.

7. A process for the purification of technical phenanthrene containing a small proportion of anthracene, comprising dissolving said technical phenanthrene in a monocyclic aromatic hydrocarbon solvent, subjecting the resultant solution to extraction with a solvent consisting essentially of liquid, substantially anhydrous hydrogen fluoride, and separating an extract phase comprising anthracene in solution in liquid hydrogen fluoride.

8. A process for separating a quinonoid hydrocarbon from an aromatic hydrocarbon fraction having a normal initial boiling point of at least about 600° F. containing both quinonoid and benzenoid hydrocarbons which process comprises extracting said aromatic hydrocarbon fraction with a solvent consisting essentially of liquid, substantially anhydrous hydrogen fluoride and separating an extract of quinonoid hydrocarbon in liquid hydrogen fluoride.

9. The process of claim 8 wherein the aromatic hydrocarbon fraction is derived from catalytic aromatization of a naphtha.

10. The process of claim 8 wherein the aromatic hydrocarbon fraction is produced by cracking a petroleum oil.

ARTHUR P. LIEN.

REFERENCES CITED

The following references are of record in the file of this patent:

UNITED STATES PATENTS

| Number | Name | Date |
|---|---|---|
| 1,456,848 | Gibbs | May 29, 1923 |
| 2,343,744 | Burk | Mar. 7, 1944 |

Certificate of Correction

Patent No. 2,426,624. September 2, 1947.

ARTHUR P. LIEN

It is hereby certified that error appears in the printed specification of the above numbered patent requiring correction as follows: Column 7, line 46, before the word "which" insert *fraction of the hydroformer bottoms*; and that the said Letters Patent should be read with this correction therein that the same may conform to the record of the case in the Patent Office.

Signed and sealed this 21st day of October, A. D. 1947.

[SEAL]

THOMAS F. MURPHY,
*Assistant Commissioner of Patents.*